(12) United States Patent
Takahashi (10) Patent No.: US 11,300,013 B2
(45) Date of Patent: Apr. 12, 2022

(54) SLIDING MEMBER

(71) Applicant: KABUSHIKI KAISHA RIKEN, Tokyo (JP)

(72) Inventor: Ikurou Takahashi, Kumagaya (JP)

( * ) Notice: Subject to any disclaimer, the term of this patent is extended or adjusted under 35 U.S.C. 154(b) by 0 days.

(21) Appl. No.: 17/437,089

(22) PCT Filed: Apr. 6, 2020

(86) PCT No.: PCT/JP2020/015566
§ 371 (c)(1),
(2) Date: Sep. 8, 2021

(87) PCT Pub. No.: WO2020/213461
PCT Pub. Date: Oct. 22, 2020

(65) Prior Publication Data
US 2022/0042425 A1  Feb. 10, 2022

(30) Foreign Application Priority Data

Apr. 18, 2019 (JP) .............................. JP2019-079130

(51) Int. Cl.
*F01L 1/14* (2006.01)
(52) U.S. Cl.
CPC ..................... *F01L 1/14* (2013.01)
(58) Field of Classification Search
CPC .................................. F01L 1/14; F01L 1/143
USPC ........................................... 123/90.48, 90.51
See application file for complete search history.

(56) References Cited

U.S. PATENT DOCUMENTS

| 1,449,193 | A | * | 3/1923 | Rich | ......................... F01L 1/14 |
| | | | | | 123/90.48 |
| 1,544,362 | A | * | 6/1925 | Elwood | .................... F16H 53/06 |
| | | | | | 123/90.48 |

FOREIGN PATENT DOCUMENTS

| JP | S51-068904 | 5/1976 |
| JP | S64-027409 | 2/1989 |
| JP | H11-157954 | 6/1999 |
| JP | 2007-046660 | 2/2007 |
| JP | 2011-256716 | 12/2011 |
| WO | 2015/107836 | 7/2015 |

OTHER PUBLICATIONS

International Preliminary Report on Patentability with Written Opinion dated Oct. 28, 2021 for PCT/JP2020/015566.
International Search Report dated Jun. 30, 2020 for PCT/JP2020/015566.

* cited by examiner

*Primary Examiner* — Jorge L Leon, Jr.
(74) *Attorney, Agent, or Firm* — Soei Patent & Law Firm (57) ABSTRACT

According to one aspect of the present invention, a sliding member includes: a sliding surface against which an outer surface of a cam abuts; and a groove having a spiral shape or a plurality of grooves having an annular shape, which are provided on the sliding surface. The sliding surface includes a central region having a circular shape and including a center of the sliding surface, and a first annular region located outside the central region. A ratio $R_C$ of a width L2 of the groove to a pitch L1 of the groove in the central region is larger than a ratio $R_{O1}$ of the width L2 of the groove to the pitch L1 of the groove in the first annular region.

17 Claims, 10 Drawing Sheets

SLIDING MEMBER

CROSS-REFERENCE TO RELATED APPLICATIONS

This application is a 35 U.S.C. § 371 national phase application of PCT/JP2020/015566, filed on Apr. 6, 2020, which claims priority to Japanese Patent Application No. 2019-079130, filed on Apr. 18, 2019.

TECHNICAL FIELD

The present invention relates to a sliding member that is in sliding contact with a mating member.

BACKGROUND ART

In a valve drive mechanism provided in an internal combustion engine, a sliding member such as a valve lifter is used. The valve lifter is in sliding contact with an outer peripheral surface of a cam of a camshaft, and causes the rotation of the camshaft to act on the opening and closing of a valve. In order to reduce frictional loss in the sliding member, in the related art, a technique of improving the retention of a lubricant on a sliding surface has been studied (refer to Patent Literatures 1 to 3).

CITATION LIST

Patent Literature

Patent Literature 1: Japanese Unexamined Utility Model Publication No. S51-68904
Patent Literature 2: Japanese Unexamined Patent Publication No. H11-157954
Patent Literature 3: Japanese Unexamined Patent Publication No. 2007-46660

SUMMARY OF INVENTION

Technical Problem

In recent years, for the purpose of further reducing friction or further improving fuel efficiency, reducing the viscosity of the lubricant has been underway. When a lubricant with a viscosity lower than that of the related art is used, there is room for further improvement in the configuration of the sliding surface of the valve lifter or the like in the related art in order to maintain a low frictional loss on the sliding surface.

The present invention provides a sliding member capable of achieving a sufficiently low frictional loss in a sliding surface even when a lubricant of a low viscosity is used.

Solution to Problem

According to one aspect of the present invention, a sliding member includes: a sliding surface against which an outer surface of a cam abuts; and a groove having a spiral shape or a plurality of grooves having an annular shape, which are provided on the sliding surface.

The sliding surface includes a central region having a circular shape and including a center of the sliding surface, and a first annular region located outside the central region. A ratio $R_C$ of a width $L2$ of the groove to a pitch $L1$ of the groove in the central region is larger than a ratio $R_{O1}$ of the width $L2$ of the groove to the pitch $L1$ of the groove in the first annular region. The sliding surface is formed of, for example, a hard film such as an amorphous hard carbon film.

As described above, the groove having a spiral shape or the plurality of grooves having an annular shape are formed in the central region and the first annular region of the sliding surface. The fact that the ratio $R_C$ in the central region is larger than the ratio $R_{O1}$ in the first annular region means that the groove is relatively densely formed in the central region while the groove is sparsely formed in the first annular region. Since such a configuration is adopted, according to the sliding member of the present invention, even when a lubricant of a low viscosity is used, a sufficiently low frictional loss on the sliding surface can be achieved. Namely, since the groove is densely formed in the central region receiving a relatively strong pressing force from a cam, a sufficient amount of the lubricant can be retained in the central region, and abrasion resistance can be sufficiently reduced. Meanwhile, since the first annular region receives a weaker pressing force from the cam than the central region, even when the groove is more sparsely formed than in the central region, a state where abrasion resistance is sufficiently small can be maintained. When the groove is formed in the first annular region as densely as in the central region, abrasion resistance can rather increase.

The groove may be formed such that the ratio of the width $L2$ to the pitch $L1$ decreases stepwise from a center side toward an outer side of the sliding surface, or may be formed such that the ratio decreases continuously. Namely, on the sliding surface, a transition from the region in which the groove is densely formed (central region) to the region in which the groove is sparsely formed (first region) may be made stepwise from the center side toward the outer side, or may be made continuously. For example, when the width $L2$ of the groove is substantially constant, the groove may be formed such that the pitch $L1$ increases stepwise or continuously from the center side toward the outer side of the sliding surface.

When the groove has a spiral shape, the groove having a spiral shape may be continuously formed from one end portion to the other end portion, or may be intermittently formed. When the plurality of grooves have an annular shape, each of the grooves having an annular shape may be continuously formed in a circumferential direction, or may be intermittently formed.

The sliding surface may further include a second annular region located outside the first annular region and along a peripheral edge of the sliding surface. The groove may be more sparsely formed in the second annular region than in the first annular region. In the case of such a mode, a ratio $R_{O2}$ of the width $L2$ of the groove to the pitch $L1$ of the groove in the second annular region is smaller than the ratio $R_{O1}$ of the width $L2$ of the groove to the pitch $L1$ of the groove in the first annular region. Alternatively, the groove may not be formed in the second annular region.

Advantageous Effects of Invention

The present invention provides the sliding member capable of achieving a sufficiently low frictional loss on the sliding surface even when a lubricant of a low viscosity is used.

DESCRIPTION OF EMBODIMENTS

Hereinafter, an embodiment of the present invention will be described in detail with reference to the accompanying drawings. Incidentally, in the description of the drawings, the same reference signs are assigned to the same elements, and a duplicated description will be omitted.

<Valve Train>

Figure 1A:
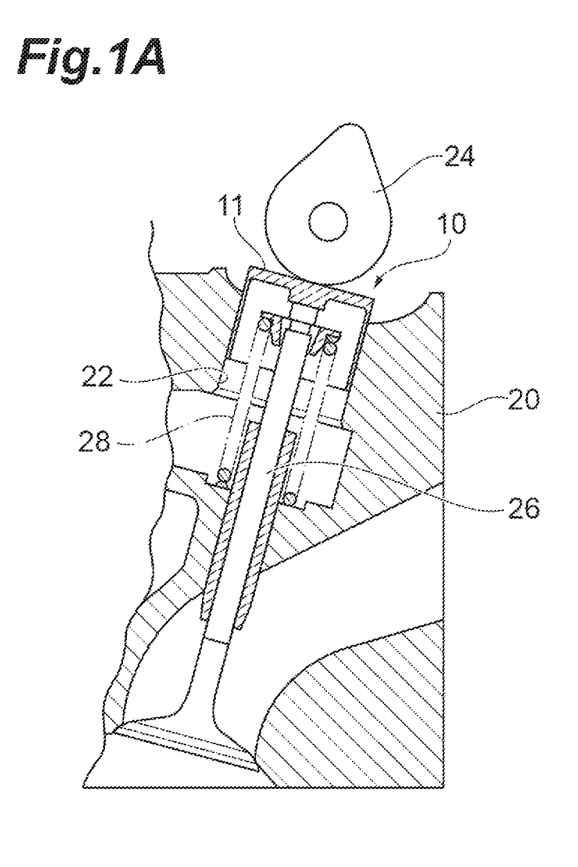
FIGS. 1A and 1B are cross-sectional views illustrating a part of a valve train of an internal combustion engine to which a sliding member according to one embodiment of the present invention is applied.
Figure 1B:
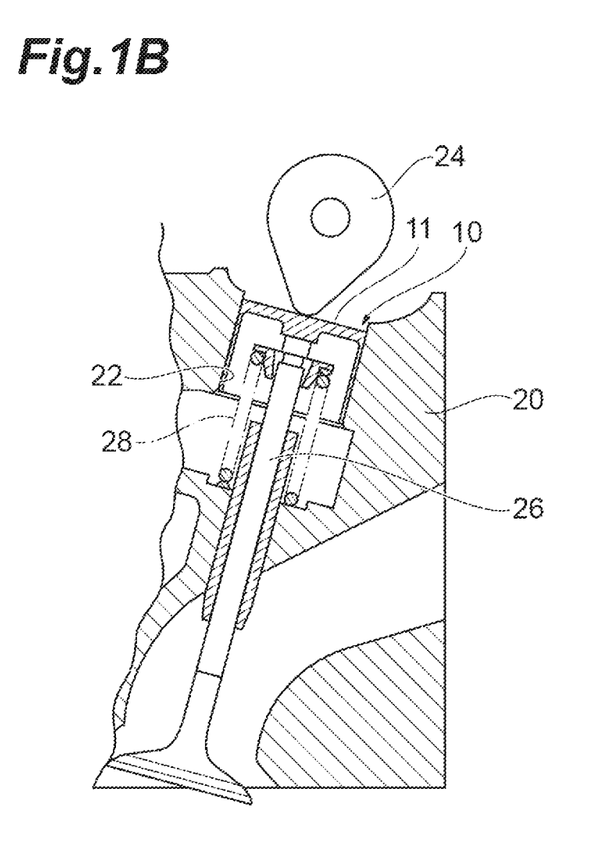

FIG. 1 illustrates a part of a valve train of an internal combustion engine to which a sliding member according to one embodiment of the present invention is applied. FIG. 1A is a cross-sectional view in a state where a valve lifter is raised and a valve is closed, and FIG. 1B is a cross-sectional view in a state where the valve lifter is lowered and the valve is opened.

A valve lifter 10 illustrated in FIG. 1A corresponds to the sliding member according to the present embodiment, and is provided in a bore 22 of a cylinder head 20. A cam 24 that slides against a sliding surface 11 of the valve lifter 10 is attached to a camshaft, and rotates as the camshaft is rotated by a drive system and the like. Since the cam 24 has a cam profile in which the distance from the center of rotation to an outer peripheral sliding surface is not constant, force pushing the sliding surface 11 of the valve lifter 10 changes due to the rotation of the cam 24. As illustrated in FIGS. 1A and 1B, as the cam 24 rotates, the valve lifter 10 moves in the bore 22, so that an opening and closing operation of a valve 26 connected to the valve lifter 10 is performed. The valve 26 is constantly biased upward in the drawing (cam side) by a valve spring 28 disposed on an outer periphery. An opening operation of the valve 26 (refer to FIG. 1B) is performed when a protrusion portion of the cam 24 presses the sliding surface 11. A lubricant is supplied from a lubricant supply means (not illustrated), which is provided on a camshaft side, to lubricate the cam 24 and the valve lifter 10. Force with which the cam 24 presses the valve lifter 10 is at maximum when a protruding tip portion of the cam 24 (cam nose) reaches the vicinity of a central region of the sliding surface 11. Incidentally, when the number of revolutions of the camshaft increases, the speed of sliding against the valve lifter 10 increases as well.

<Valve Lifter>

Figure 2:
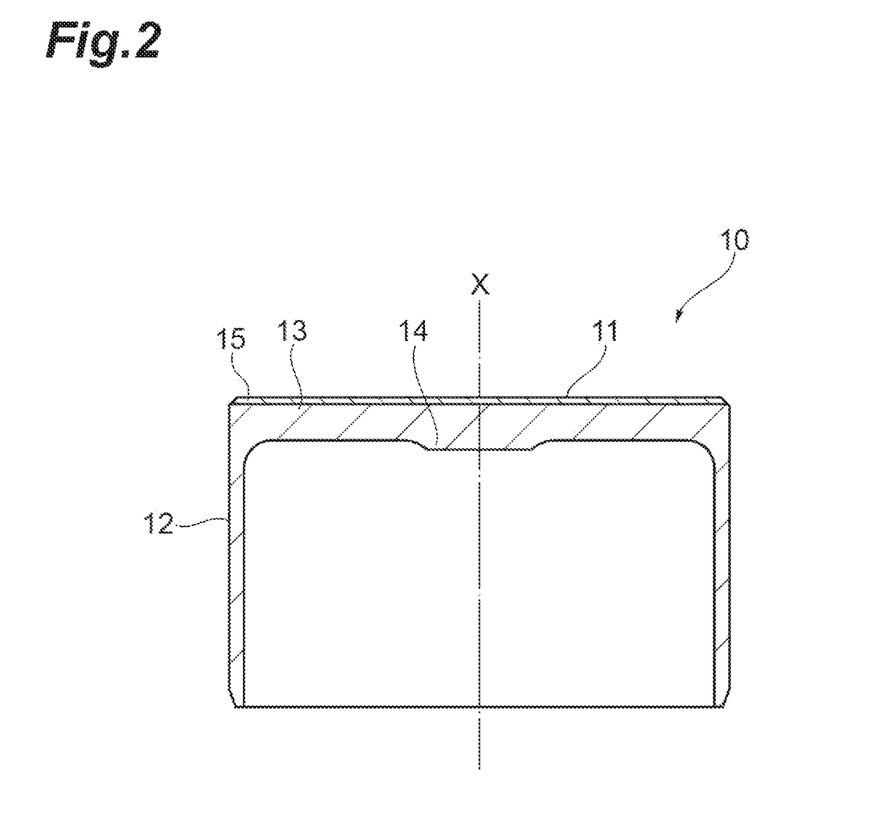
FIG. 2 is a cross-sectional view illustrating a valve lifter illustrated in FIG. 1.
Figure 3:
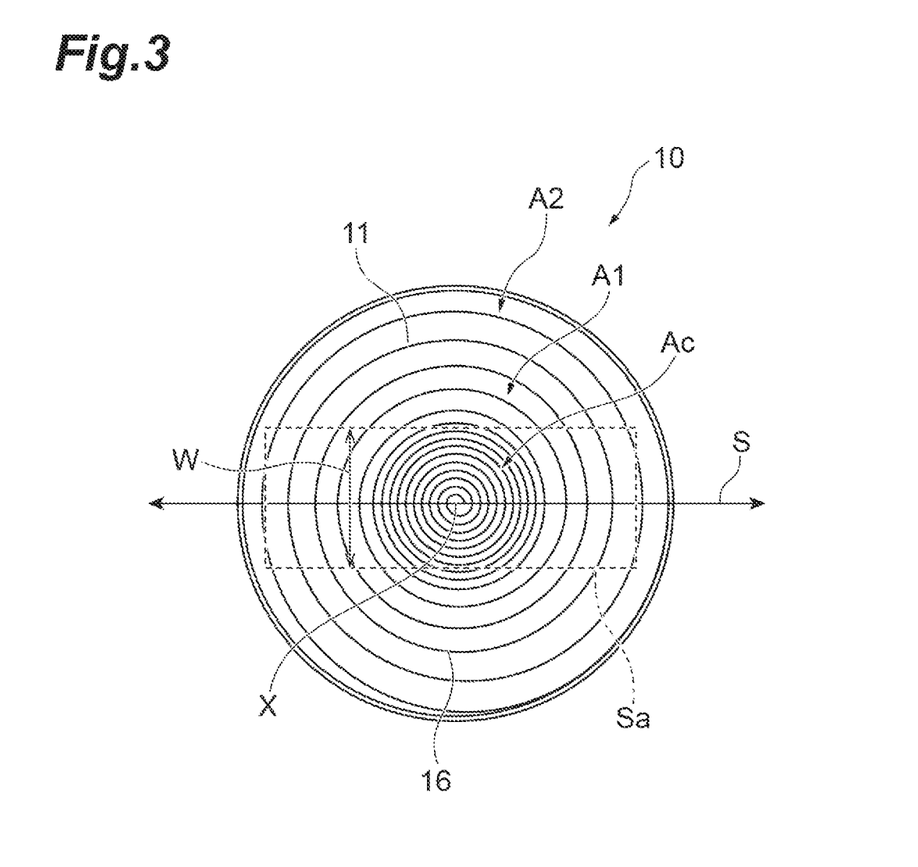
FIG. 3 is a top view schematically illustrating a mode of a groove formed in a sliding surface of the valve lifter.

FIG. 2 is a cross-sectional view of the valve lifter 10, and FIG. 3 is a top view of the valve lifter 10. As illustrated in these drawings, the valve lifter 10 has a cylindrical shape in which one side is open, and specifically, includes a skirt portion 12 having a cylindrical shape; a crown portion 13 integrally formed with the skirt portion 12 in an upper end portion that is one end side of the skirt portion 12 in a central axis X direction; and an amorphous hard carbon film 15 provided on an upper surface of the crown portion 13 (one surface on a side opposite a skirt portion 12 side). A boss portion 14 having a circular shape is provided in the vicinity of the center of a lower surface (main surface on the skirt portion 12 side) of the crown portion 13. The boss portion 14 abuts against an upper end of the valve 26 (valve stein). A tapered chamfered portion is formed at a boundary between the skirt portion 12 and the sliding surface 11.

The sliding surface 11 has a circular shape as illustrated in FIG. 3, and the cam 24 slides in a partial region (sliding range Sa illustrated by a dotted line in FIG. 3) of the sliding surface 11 in a direction of an arrow S illustrated in FIG. 3. Namely, the arrow S indicates a sliding direction of the cam 24, and a contact point between the cam 24 rotating in one direction and the sliding surface 11 reciprocates in a direction along the arrow S. The sliding range Sa illustrated by a dotted line indicates a movement range of the cam 24 sliding along the arrow S. During sliding against the cam 24, for the purpose of rotating the valve lifter 10 around a central axis thereof in the bore 22, the center position of a cam width is located slightly offset from the central axis of a crown surface of the valve lifter to an outer periphery side. The sliding range Sa of the cam may be set to be slightly larger than the cam width in consideration of the offset.

The sliding surface 11 in the present embodiment is formed of a nitride, a carbide, a carbonitride and a boride of a metal that are obtained by physical vapor deposition (PVD) or chemical vapor deposition (CVD), hard plating, or a hard film such as an amorphous hard carbon film. The sliding surface 11 may be formed of the amorphous hard carbon film 15. A carburized SCM material according to JIS standards can be used as the material of a main body portion (the skirt portion 12, the crown portion 13, and the boss portion 14) of the valve lifter 10. Steels, castings, iron-based alloys, titanium alloys, aluminum alloys, high-strength resins, and the like other than the carburized SCM material may be used.

As illustrated in FIG. 3, a groove 16 having a spiral shape and having a central axis X (hereinafter, simply referred to as an "axis X") of the sliding surface 11 as a center is formed on the sliding surface 11. The groove 16 is continuously formed from an end portion on the outer periphery side of the sliding surface 11 to an end portion in a central portion (the vicinity of the axis X). The groove 16 can be formed by a method in which the amorphous hard carbon film 15 is irradiated with laser. For example, in a state where the valve lifter before the groove 16 is formed is rotated around the axis X, the sliding surface 11 is irradiated with laser in a radial direction from the outer periphery side toward the central portion. At this time, the groove 16 illustrated in FIG. 3 can be formed by controlling the rotation speed of the valve lifter, the movement speed of laser, the irradiation intensity of laser, or the like. Examples of usable laser include ultrashort pulse laser and linearly polarized laser. It is preferable that of the above lasers, ultrashort pulse laser having a pulse interval of picoseconds to femtoseconds is adopted as the laser used to form the groove 16.

The sliding surface 11 is divided into, for example, three regions from the central portion toward a peripheral edge portion according to the mode of the groove 16. Namely, the sliding surface 11 includes a central region Ac having a circular shape including the center of the sliding surface 11, a first annular region A1 located outside the central region Ac, and a second annular region A2 located outside the first annular region A1. It is preferable that the central region Ac has a circular shape, and has a diameter according to the width of the sliding range Sa of the cam (width W in FIG. 3). Namely, it is preferable that the diameter of the central region Ac is the same as the width W or is the width W or more. The first annular region A1 is a region between the central region Ac and the second annular region A2. The second annular region A2 is a region along a peripheral edge of the sliding surface 11.

Figure 4A:
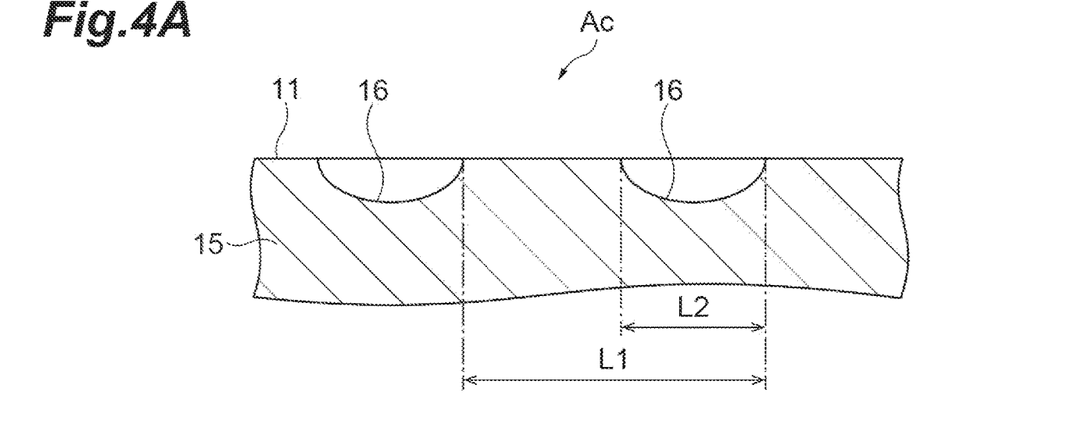
FIGS. 4A to 4C are enlarged cross-sectional views schematically illustrating the groove formed on the sliding surface.
Figure 4B:
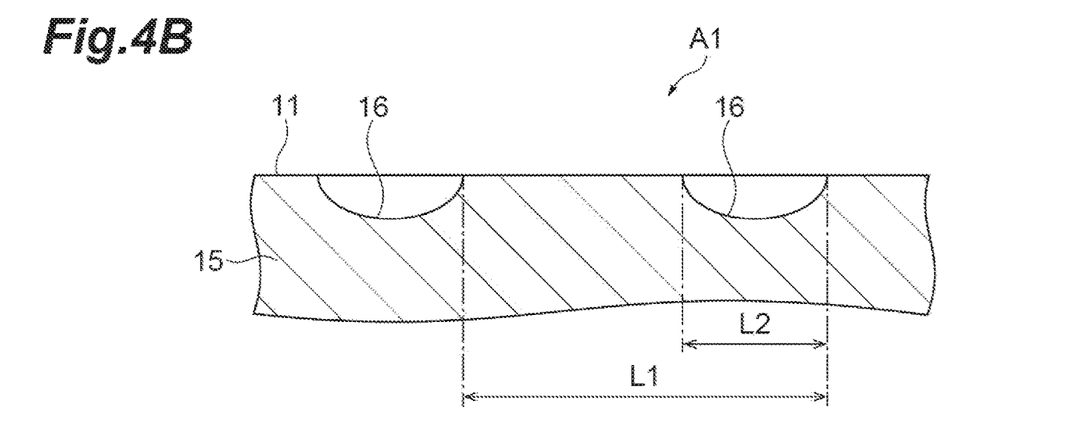

As illustrated in FIG. 3, the groove 16 is more densely formed in the central region Ac than in the first annular region A1. Namely, as illustrated in FIGS. 4A and 4B, a ratio $R_C$ of a width L2 of the groove to a pitch L1 of the groove 16 in the central region Ac is larger than a ratio $R_{O1}$ of the width L2 of the groove to the pitch L1 of the groove in the first annular region A1. In the present embodiment, the width L2 of the groove 16 is substantially constant, and the pitch L1 of the groove 16 in the central region Ac is set to be smaller than the pitch L1 of the groove in the first annular region A1. The width L2 of the groove 16 is, for example, from 20 to 200 μm, and may be from 50 to 160 μm or from 80 to 120 μm. The depth of the groove 16 is preferably from 100 to 400 nm from the viewpoint of reducing friction in a low rotation range, and may be from 100 to 300 nm or from 150 to 250 nm.

The ratio $R_C$ of the groove 16 in the central region Ac is, for example, from 0.2 to 0.8, and may be from 0.3 to 0.7 or from 0.4 to 0.6. When the ratio $R_C$ of the central region Ac is 0.2 or more, the lubricant is easily retained in the central region Ac. Meanwhile, when the ratio $R_C$ is 0.8 or less, a rise in sliding resistance caused by an excess of the lubricant can be suppressed.

The ratio $R_{O1}$ of the groove 16 in the first annular region A1 is smaller than the ratio $R_C$ described above. The ratio $R_{O1}$ of the first annular region A1 is, for example, from 0.1 to 0.6, and may be from 0.1 to 0.5 or from 0.2 to 0.4. When the ratio $R_{O1}$ of the first annular region A1 is 0.1 or more, the lubricant is easily retained in the first annular region A1. Meanwhile, when the ratio $R_{O1}$ is 0.6 or less, a rise in sliding resistance caused by an excess of the lubricant can be suppressed. A ratio $R_C/R_{O1}$ is, for example, more than 1 and 8 or less, and may be from 1.1 to 3.

Figure 4C:
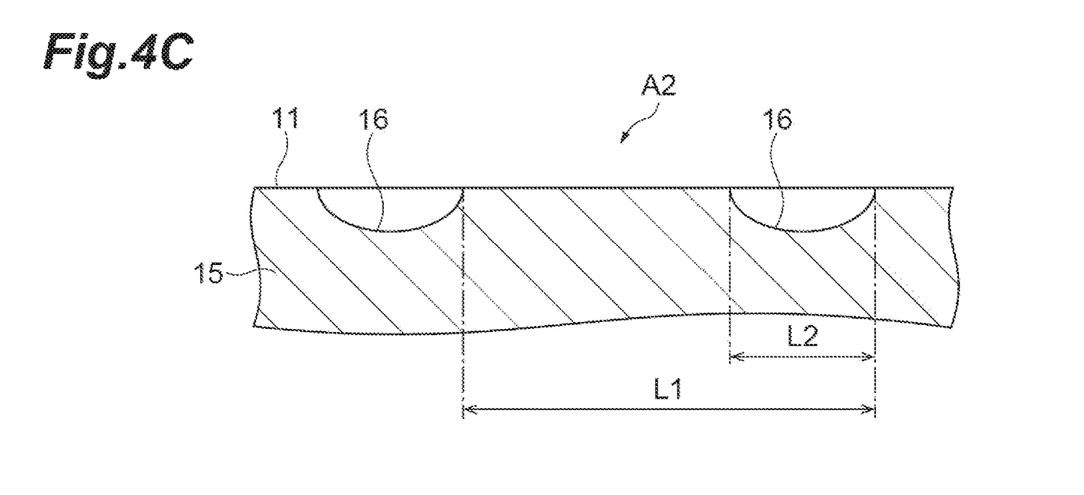

As illustrated in FIGS. 4B and 4C, the ratio $R_{O1}$ of the width L2 of the groove to the pitch L1 of the groove 16 in the first annular region A1 is larger than a ratio $R_{O2}$ of the width L2 of the groove to the pitch L1 of the groove in the second annular region A2. As described above, the width L2 of the groove 16 is substantially constant, and the pitch L1 of the groove 16 in the first annular region A1 is set to be smaller than the pitch L1 of the groove in the second annular region A2. The ratio $R_{O2}$ of the second annular region A2 is, for example, from 0.05 to 0.4, and may be from 0.1 to 0.4 or from 0.2 to 0.3. When the ratio $R_{O2}$ of the second annular region A2 is 0.4 or less, a rise in sliding resistance caused by an excess of the lubricant can be suppressed. A ratio $R_{O1}/R_{O2}$ is, for example, more than 1 and 12 or less, and may be from 1.1 to 3.

The cross-sectional shape of the groove 16 is not particularly limited. For example, as illustrated in FIGS. 4A to 4C, the groove 16 may have a shape in which a side surface and a bottom surface are continuous to each other in a curved shape, or may have a shape in which the side surface and the bottom surface are clearly distinguished from each other. Further, the groove 16 may have a so-called V-groove shape in which the inside of the groove 16 is formed by two surfaces.

As the hard film forming the sliding surface 11, a nitride, a carbide, and a carbonitride of a metal such as Ti or Cr and a boride of BN or the like that are obtained by physical vapor deposition (PVD) or chemical vapor deposition (CVD), hard Cr plating, an amorphous hard carbon film, or the like can be applied. Particularly, the hard film may be formed of an amorphous hard carbon film. Amorphous hard carbon is called diamond-like carbon (DLC), hydrogenated amorphous carbon (a-c:H), i-carbon, diamond-like carbon, or the like, and structurally, has carbon-carbon bonds in which diamond-structure bonds ($sp^3$-type bonds) and graphite-structure bonds ($sp^2$-type bonds) are mixed. Since the sliding surface 11 is formed of the amorphous hard carbon film 15, abrasion or the like of the sliding surface 11 caused by sliding against the cam 24 is suppressed, so that a decrease in performance of the valve lifter 10 can be prevented and the lifespan of the valve lifter 10 can be extended.

The thickness of the amorphous hard carbon film 15 is, for example, from 0.4 to 10 μm. When the thickness of the amorphous hard carbon film 15 is 0.4 μm or more, the valve lifter 10 has sufficient durability. Meanwhile, when the thickness of the amorphous hard carbon film 15 is 10 μm or less, an excessive increase in internal stress of the film can be suppressed, and the occurrence of chipping and peeling is easily suppressed. From the viewpoint of productivity of the valve lifter 10, the thickness of the amorphous hard carbon film 15 may be from 0.7 to 2.0 μm. Incidentally, the depth of the groove provided on the sliding surface is set to be smaller than the thickness of the amorphous hard carbon film.

The amorphous hard carbon film 15 can be formed, for example, by using an arc ion plating device including a graphite cathode in an evaporation source. According to this device, the amorphous hard carbon film 15 can be formed through a step in which vacuum arc discharge is generated between the graphite cathode and an anode in a vacuum atmosphere, a carbon material evaporates from a surface of a carbon cathode and is ionized, and carbon ions are deposited on the upper surface of the crown portion 13 to which a negative bias voltage is applied.

The amorphous hard carbon film 15 may or may not contain hydrogen, but it is preferable that the amorphous hard carbon film 15 does not substantially contain hydrogen (hydrogen content is less than 5 atomic %) from the viewpoint of achieving a low coefficient of friction. Specifically, the hydrogen content of the amorphous hard carbon film 15 is preferably less than 5 atomic %, more preferably less than 3 atomic %, further preferably less than 2 atomic %, and particularly preferably less than 1 atomic %. When the amorphous hard carbon film 15 does not substantially contain hydrogen, dangling bonds of carbon atoms of a surface of the amorphous hard carbon film 15 are not terminated with hydrogen, so that oil-based agent constituent molecules having OH groups in the lubricant are easily adsorbed on the surface of the amorphous hard carbon film 15, and accordingly, the amorphous hard carbon film 15 has been confirmed to display a very low coefficient of friction. In addition, amorphous hard carbon that does not substantially contain hydrogen has good thermal conductivity characteristics. The hydrogen content of the amorphous hard carbon film 15 can be measured by Rutherford backscattering spectrometry (RBS) or hydrogen forward scattering spectrometry (HFS).

In order to form the amorphous hard carbon film 15 that does not substantially contain hydrogen, the film may be formed without introducing carbon-based gas. Incidentally, hydrogen of less than 5 atomic % may be contained due to moisture remaining on a wall surface in the device. Droplets characteristically formed in arc ion plating are incorporated into the amorphous hard carbon film 15 to reduce the film strength. Droplets can be reduced by using a device equipped with a magnetic filter, which adopts a filtered arc method. The amorphous hard carbon film 15 formed by using this device has sufficiently few and sufficiently homogeneous droplets, and has good abrasion resistance.

Figure 5:
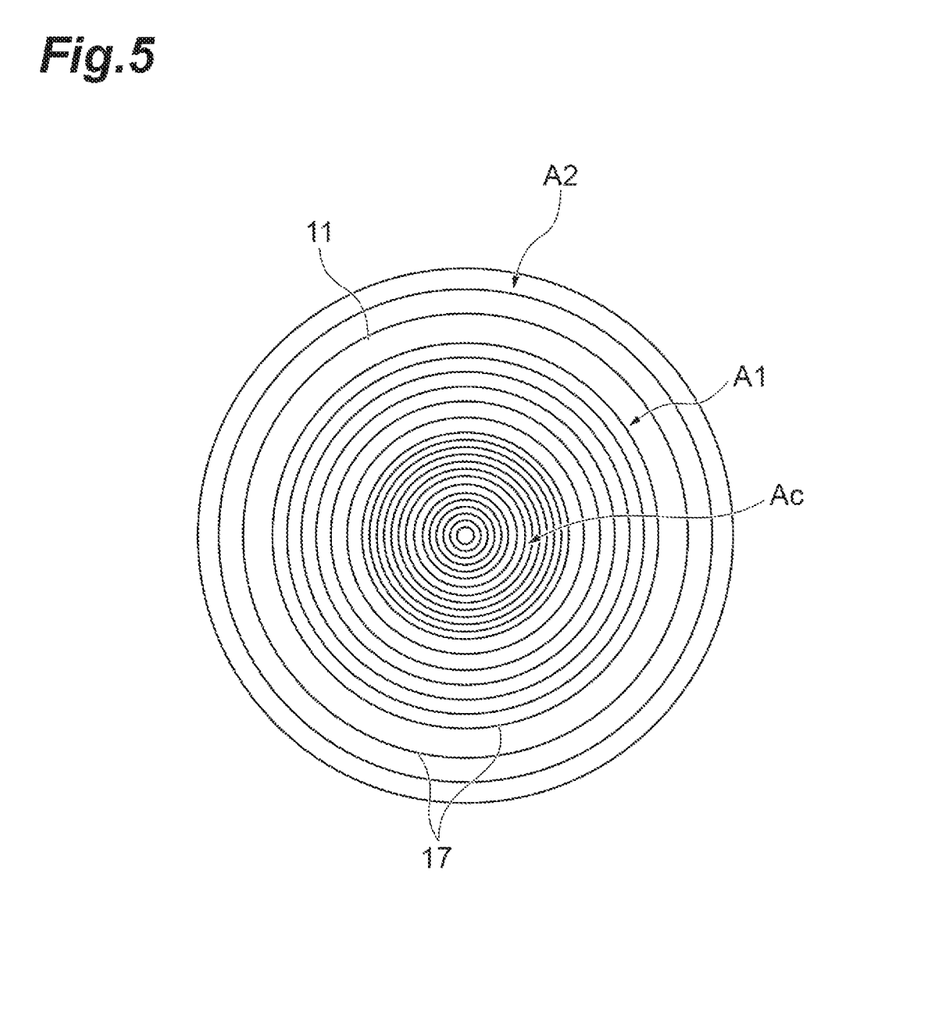
FIG. 5 is a top view of the valve lifter schematically illustrating another mode of the groove.

The embodiment of the present invention has been described above, and the present invention is not limited to the embodiment. For example, in the embodiment, the case has been illustrated in which the groove 16 having a spiral shape is continuously formed from one end portion to the other end portion; however, the groove 16 may be intermittently formed. In addition, the mode of the groove may not be a spiral shape, and as illustrated in FIG. 5, instead of the groove 16 having a spiral shape, a plurality of grooves 17 that are concentric with each other may be formed on the sliding surface 11. Each of the plurality of grooves 17 having an annular shape may also be continuously formed in a circumferential direction, or may be intermittently formed.

Figure 6:
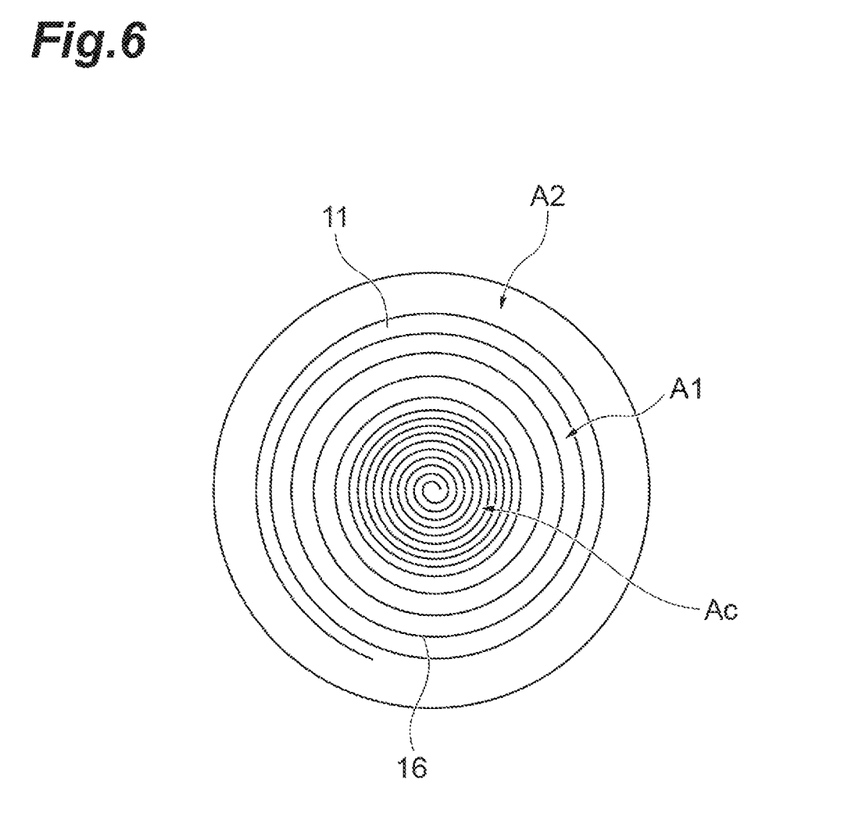
FIG. 6 is a top view of the valve lifter schematically illustrating another mode of the groove.
Figure 7:
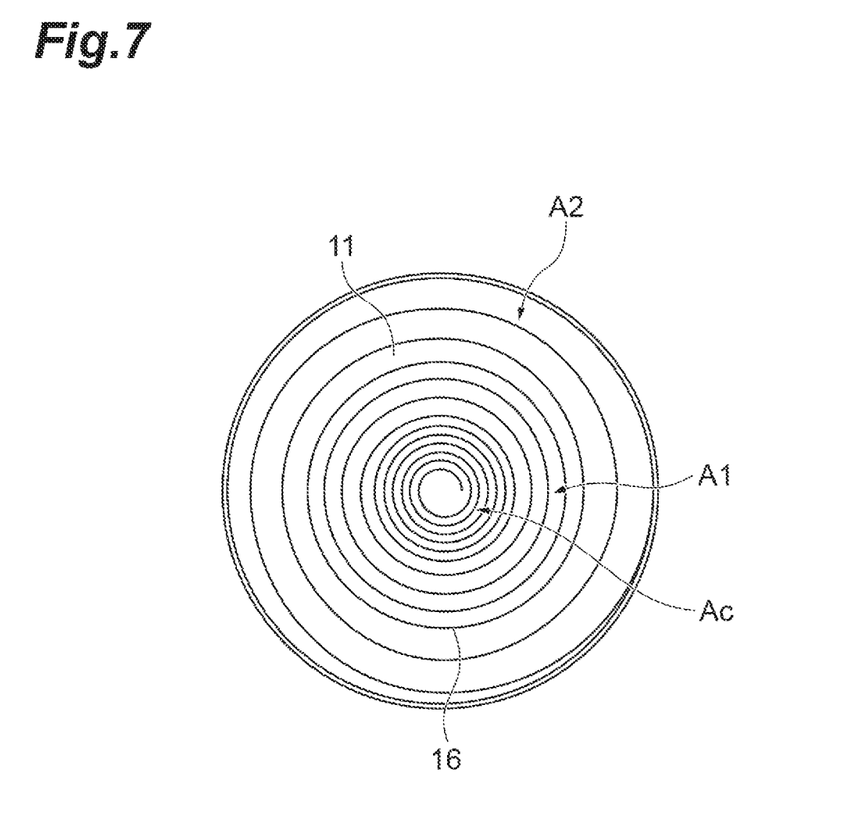
FIG. 7 is a top view of the valve lifter schematically illustrating another mode of the groove.

In the embodiment, the mode has been illustrated in which the groove 16 is more sparsely formed in the second annular region A2 than in the first annular region A1; however, the groove may not be formed in the second annular region A2 (refer to FIG. 6), or the groove 16 may be continuously and more sparsely formed in the second annular region A2 than in the first annular region A1 (refer to FIG. 7). The mode of the second annular region A2 may be appropriately selected according to the type, viscosity, and the like of the lubricant.

Figure 8A:
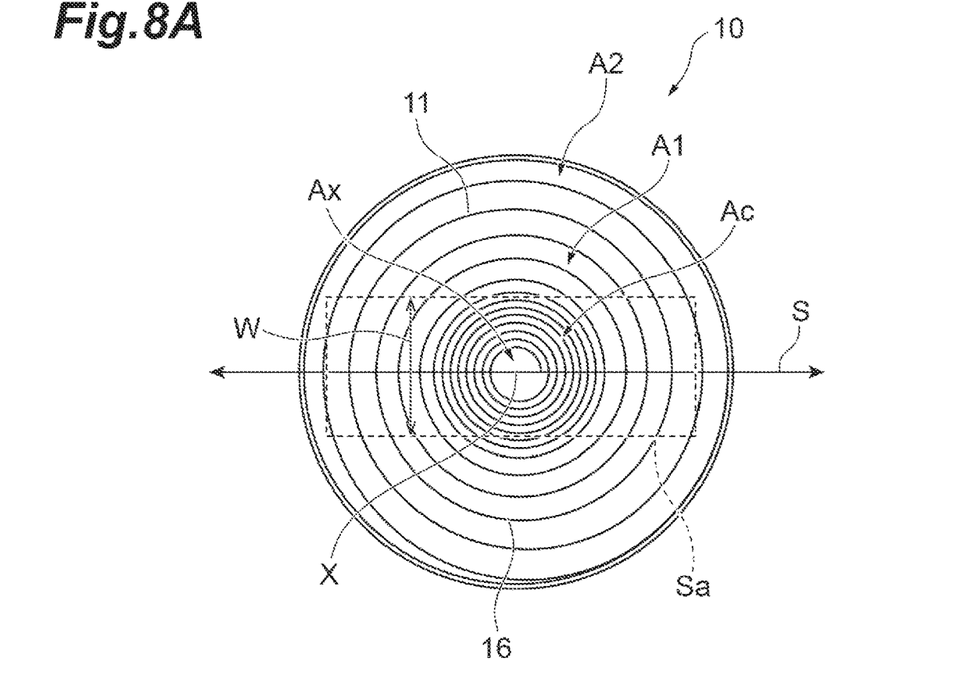
FIGS. 8A and 8B are top views of the valve lifter schematically illustrating a modification example of the groove.
Figure 8B:
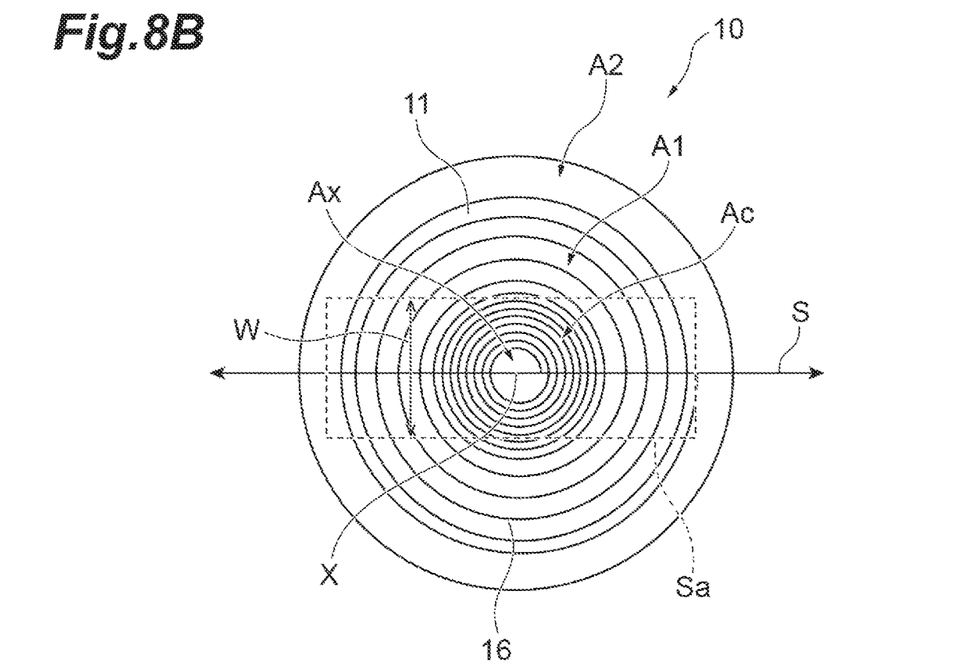

In the embodiment, the mode has been illustrated in which the groove 16 is formed to the vicinity of the central axis X in the central region Ac (refer to FIGS. 3 and 6); however, as illustrated in FIGS. 8A and 8B, an unprocessed portion of the groove may be partially provided in the vicinity of the central axis X in the central region Ac. Namely, the central region Ac may include a central portion Ax in which the groove is not formed. The reason is that the central portion Ax easily retains the lubricant even when the groove 16 or the grooves 17 are not formed. Since the groove 16 or the grooves 17 are not formed in the central portion Ax, processing is facilitated. The ratio of the diameter of the central portion Ax to the diameter of the central region Ac is, for example, from 0.1 to 0.6, and may be from 0.15 to 0.5. The mode of the central region Ac may be appropriately selected according to the type, viscosity, and the like of the lubricant.

In the embodiment, the mode has been illustrated in which the sliding surface 11 includes the second annular region A2; however, the sliding surface 11 may not include the second annular region A2. In this case, a region from a peripheral edge of the central region Ac to the peripheral edge of the sliding surface 11 is the first annular region A1.

Figure 9:
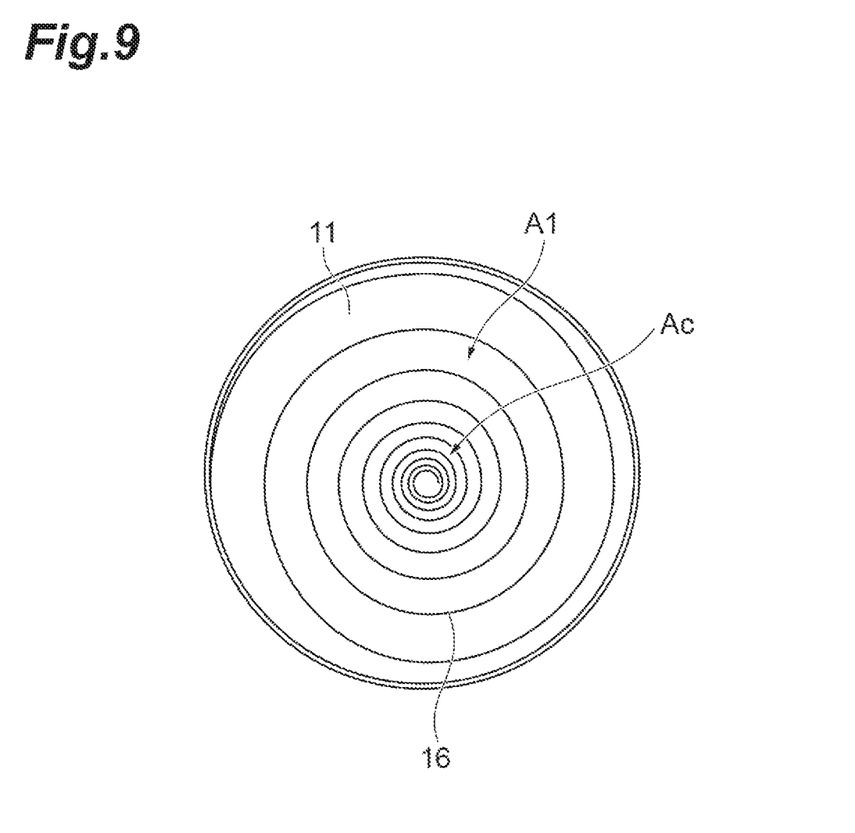
FIG. 9 is a top view of the valve lifter schematically illustrating another mode of the groove.

As illustrated in FIG. 3 and FIGS. 5 to 8, the mode has been illustrated in which in a transition from the central region Ac to the first annular region A1, the pitch of the groove 16 changes to the extent that the change can be said as being stepwise; however, the pitch of the groove 16 may be continuously widened (refer to FIG. 9). Examples of the curve drawn by the groove 16 illustrated in FIG. 9 include an involute curve (involute) and a logarithmic spiral. When the pitch of the groove 16 is continuously widened, a boundary between the central region Ac and the first annular region A1 is not always clear, but the boundary between both the regions can be defined based on the width of the sliding range Sa of the cam (width W in FIG. 3). For example, a circular region having the same diameter as the width W can be defined as the central region Ac. Alternatively, the boundary between both the regions may be defined based on the value of a ratio of the width L2 to the pitch L1. For example, a region in which the ratio is 0.5 or more may be defined as the central region Ac, and a region outside a point at which the ratio is less than 0.5 may be defined as the first annular region A1.

In the embodiment, the valve lifter has been illustrated as being a sliding member; however, the sliding member according to the present invention may be applied to other members such as a shim and a tappet of a cam follower member.

EXAMPLES

Hereinafter, the present invention will be described based on Examples. The present invention is not limited to the following Examples.

Example

Except that a sliding surface included a central region and a first annular region but did not include a second annular region, a valve lifter having the same configuration as that illustrated in FIG. 3 was produced. The mode of the valve lifter according to this example is as follows.

Material of sliding surface: amorphous hard carbon film (hydrogen content: 5 atomic %)
Diameter of sliding surface: 29 mm
Mode of groove: continuous spiral shape
Depth of groove: 0.2 μm
Pitch L1 of groove: 0.2 mm (central region), 0.3 mm (first annular region)
Width L2 of groove: 0.1 mm
Central region: region having a radius of 6 mm or less
First annular region: region having a radius of 6 mm to 14.5 mm
Ratio $R_C$ of central region (L2/L1): 0.5
Ratio $R_{O1}$ of first annular region (L2/L1): 0.33
Method for processing groove: laser processing Comparative Example 1

Except that groove was formed in a sliding surface at equal pitch intervals, a valve lifter was produced in the same manner as in Example. The mode of the groove according to this comparative example is as follows.

Mode of groove: continuous spiral shape
Depth of groove: 0.2 μm
Pitch L1 of groove: 0.2 mm
Width L2 of groove: 0.1 mm
Ratio (L2/L1): 0.5

Comparative Example 2

Figure 10:
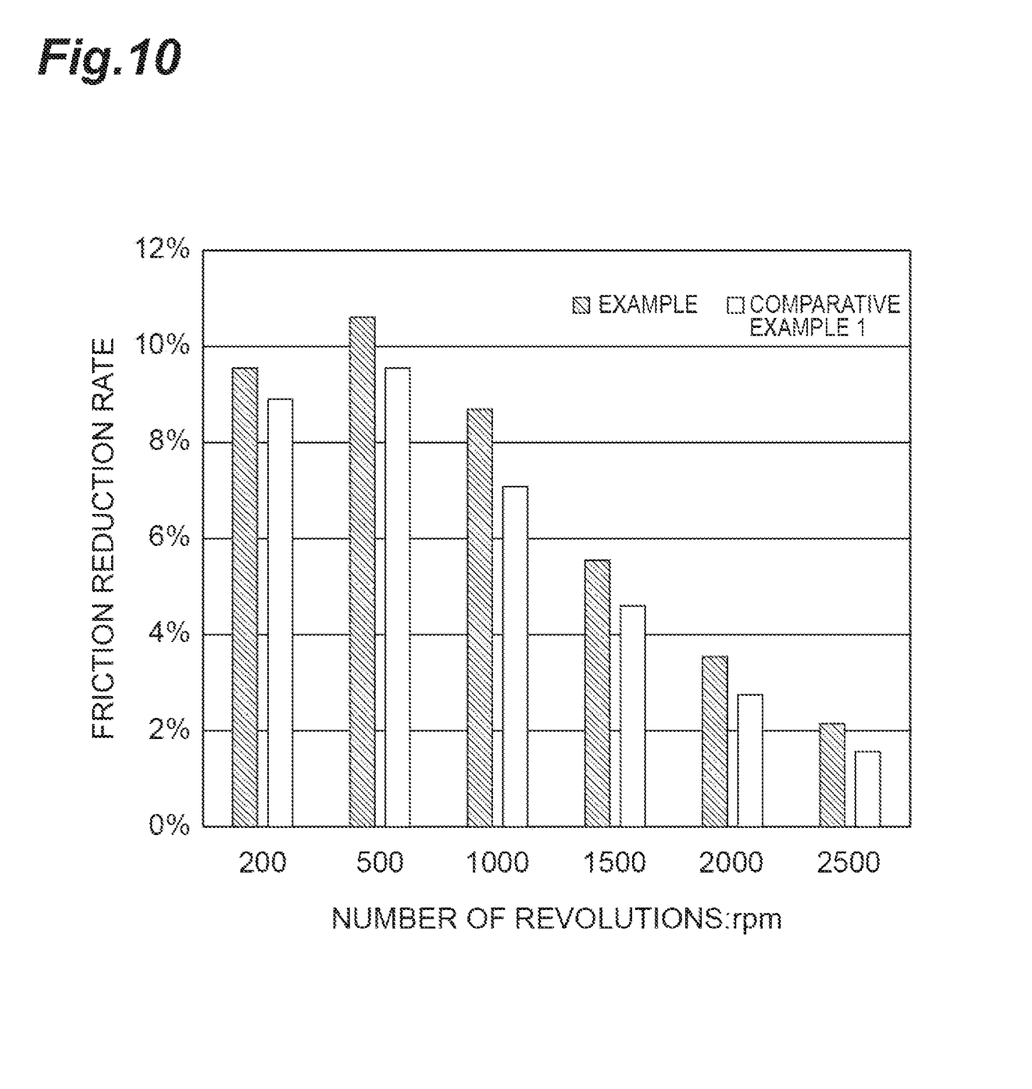
FIG. 10 is a graph illustrating results of an example and a comparative example.

Except that no groove was formed in a sliding surface, a valve lifter was produced in the same manner as in Example.
<Confirmation of Friction Reduction Effect>
Torque of the camshaft was measured while causing an outer surface of the cam to slide against the sliding surface of the valve lifter according to Comparative Example 2. The rotation speed of the camshaft was changed stepwise from 200 rpm to 2500 rpm. Similarly, torque of the camshaft was measured using each of the valve lifters according to Example and Comparative Example 1. FIG. 10 is a graph illustrating a friction reduction rate (%) calculated by the following equation.

Friction reduction rate (%)=[(torque of Comparative Example 2)−(torque of Example or Comparative Example 1)]/(torque of Comparative Example 2)×100

As illustrated in the graph of FIG. 10, better friction reduction effect was obtained over the entire range of the rotation speed of the camshaft from 200 rpm to 2500 rpm in Example than in Comparative Example 1.

INDUSTRIAL APPLICABILITY

The present invention provides the sliding member capable of achieving a sufficiently low frictional loss on the sliding surface even when a lubricant of a low viscosity is used.

REFERENCE SIGNS LIST

11: sliding surface, 15: amorphous hard carbon film, 16: groove having spiral shape, 17: groove having annular shape, 24: cam, Ac: central region, A1: first annular region, A2: second annular region.

The invention claimed is:

1. A sliding member comprising:
a sliding surface configured to abut an outer surface of a cam, the sliding surface including a spiral groove or a plurality of concentric annular grooves
wherein the sliding surface comprises a circular central region and a first annular region encircling the central region, and
wherein a ratio of groove width (L2) to groove pitch (L1) is greater in the central region than in the first annular region.

2. The sliding member according to claim 1, wherein the ratio decreases stepwise or continuously from a center of the sliding surface toward a peripheral edge of the sliding surface.

3. The sliding member according to claim 1, wherein the groove pitch (L1) increases stepwise or continuously from a center of the sliding surface toward a peripheral edge of the sliding surface.

4. The sliding member according to claim 1, wherein, in the central region, the ratio is at least 0.2 and at most 0.8.

5. The sliding member according to claim 1, wherein, in the first annular region, the ratio is at least 0.1 and at most 0.6.

6. The sliding member according to claim 1, wherein a ratio of the ratio in the central region to the ratio in the first annular region is greater than 1 and at most 8.

7. The sliding member according to claim 1, wherein the sliding surface includes the spiral groove, and wherein the spiral groove is formed continuously or intermittently.

8. The sliding member according to claim 1, wherein the sliding surface includes the plurality of concentric annular grooves, and wherein each groove is formed continuously or intermittently.

9. The sliding member according to claim 1, wherein a groove depth is at least 100 nm and at most 400 nm.

10. The sliding member according to claim 1, wherein the sliding surface is formed of a film.

11. The sliding member according to claim 10, wherein the film is an amorphous carbon film.

12. The sliding member according to claim 1, wherein the sliding surface further comprises a second annular region encircling the first annular region and including a peripheral edge of the sliding surface.

13. The sliding member according to claim 12, wherein the ratio is greater in the first annular region than in the second annular region.

14. The sliding member according to claim 13, wherein, in the second annular region, the ratio is at least 0.05 and at most 0.4.

15. The sliding member according to claim 13, wherein a ratio of the ratio in the first annular region to the ratio in the second annular region is greater than 1 and at most 12.

16. The sliding member according to claim 12, wherein neither the spiral groove nor the plurality of concentric annular grooves is formed in the second annular region.

17. The sliding member according to claim 1, wherein the sliding member is a valve lifter or a shim.

* * * * *